April 24, 1934.  C. W. COLLINS  1,956,316
BRAKE MECHANISM
Filed Feb. 21, 1931   2 Sheets-Sheet 2
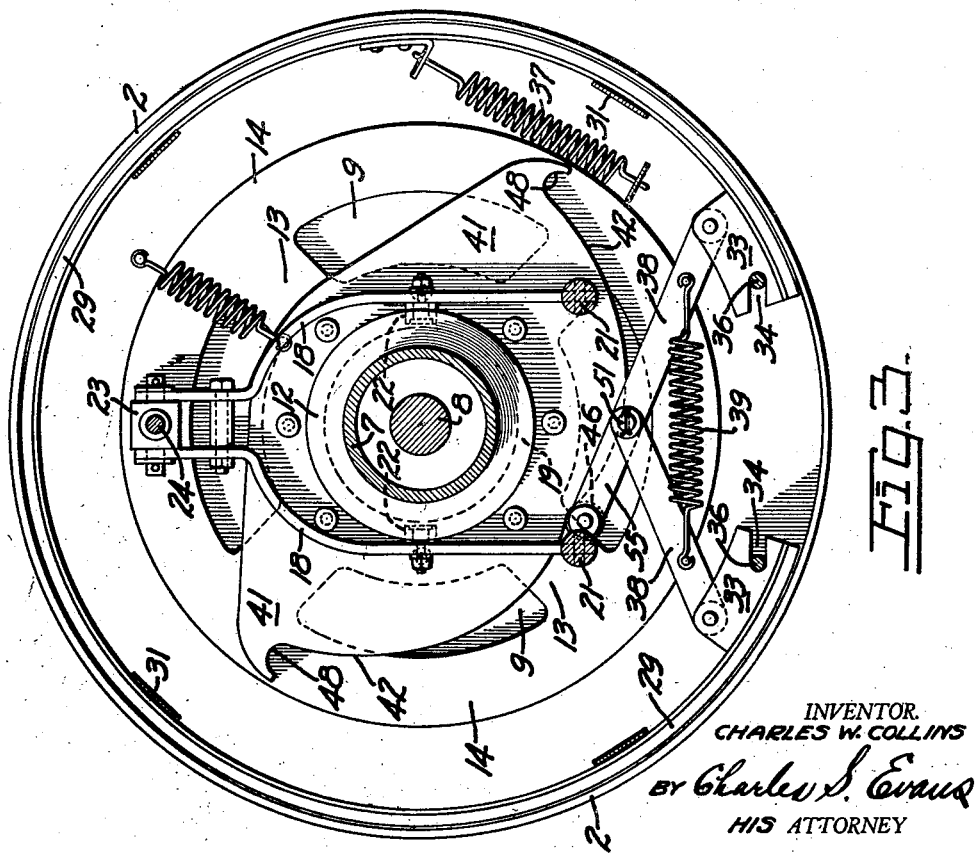
INVENTOR.
CHARLES W. COLLINS
BY Charles S. Evans
HIS ATTORNEY Patented Apr. 24, 1934

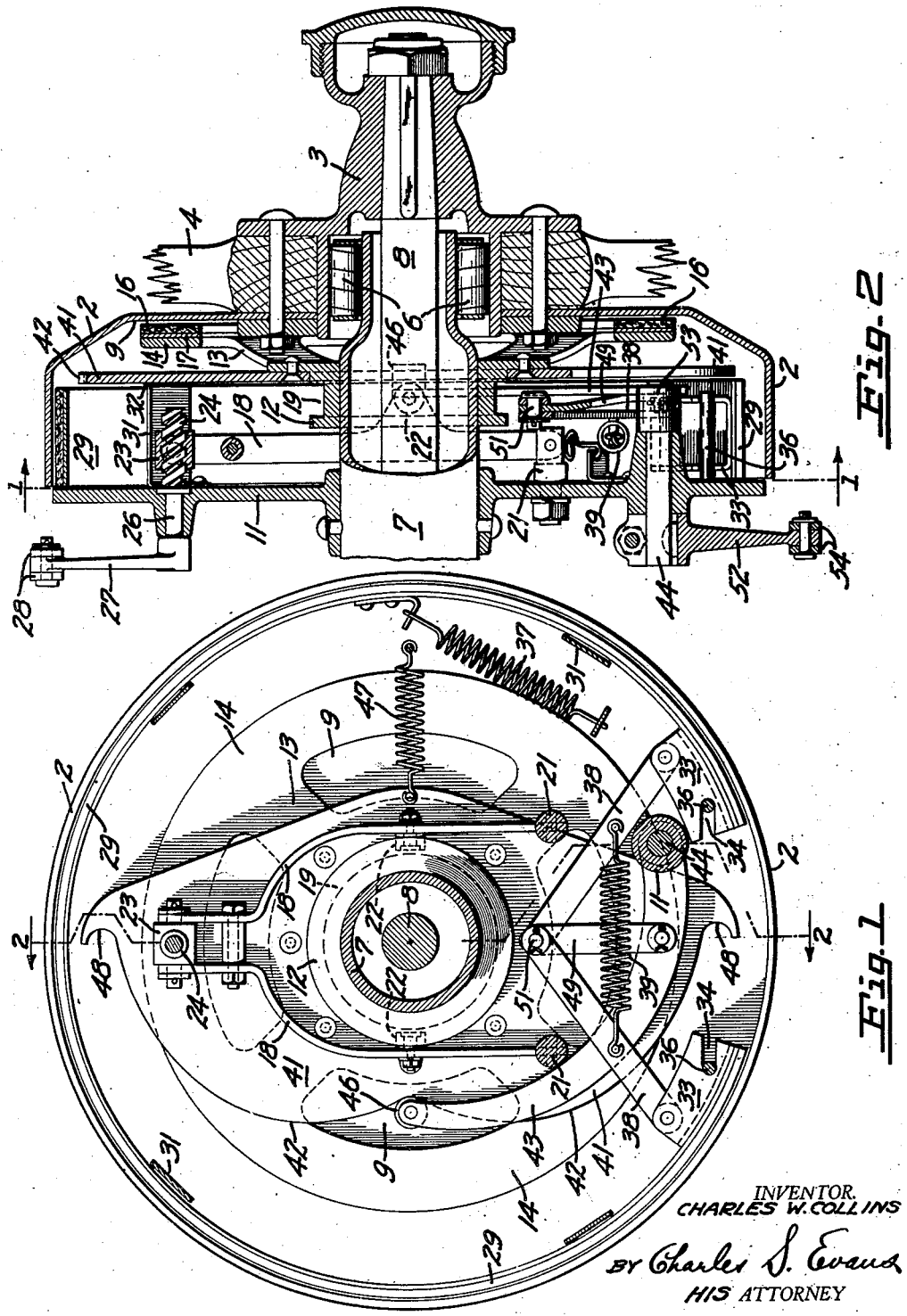

1,956,316

UNITED STATES PATENT OFFICE 1,956,316

BRAKE MECHANISM

Charles W. Collins, Seattle, Wash.

Application February 21, 1931, Serial No. 517,494

4 Claims. (Cl. 188—140)

My invention relates to a brake mechanism, and particularly to such a mechanism for motor vehicles.

It is among the objects of my invention to provide a brake mechanism in which a large portion of the retarding or braking force is derived from the movement to be retarded.

Another object of my invention is to provide a mechanism which, by the application of a comparatively small force on the part of a driver, is effective in braking large and heavy vehicles, such as trucks.

Further objects of my invention include the provision of a mechanism in which the braking action is independent of the direction of rotation of the braked wheel; which will prevent skidding or sliding of the wheels; and in which the braking force is proportional to the movement being retarded.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a transverse vertical sectional view of the brake mechanism embodying my invention, taken in a plane indicated by the line 1—1 of Figure 2.

Figure 2 is a longitudinal vertical sectional view of the brake mechanism, taken in a plane indicated by the line 2—2 of Figure 1; portions of a vehicle wheel and mounting being shown to indicate the operative relationship.

Figure 3 is a view similar to that shown in Figure 1, illustrating a variant form of my invention.

In terms of broad inclusion, the brake mechanism embodying my invention comprises a rotatable drum with which a brake band and a turnable clutch member are engageable. Means are provided for moving the clutch member into engagement with the brake drum, and means are provided for engaging the brake band and drum upon turning of the clutch member. Preferably, the clutch member is provided with a cam operatively connected with the brake band by a linkage.

In greater detail, the brake mechanism embodying my invention comprises a drum 2 secured to the hub 3 of a vehicle wheel 4. The wheel is shown as being mounted on the roller bearings 6 which run on the axle housing 7 in the usual manner; the drive for the wheel being provided by the live axle 8. The drum 2 differs from that found in the ordinary brake only in having its disk surface 9 smoothly finished to provide a clutch surface. A disk 11 mounted on the axle housing 7 provides a backing plate for the brake drum 2.

Slidably and turnably mounted on the axle housing 7, within the brake drum 2, is an annular ring 12 carrying a clutch member or disk 13; this disk being dished to clear the wheel hub and drum mounting, and having a peripheral flange 14 faced with a frictional material 16. The frictional material is preferably mounted on a thin ring 17. Any suitable substance may be used in the material 16, providing a frictional surface is presented which will engage smoothly and easily and disengage instantly.

Means are provided for moving the clutch member 13 into engagement with the clutch surface 9 of the drum 2, and to this end a yoke 18 is provided straddling the annular groove 19 in the clutch member hub ring 12. The yoke 18 is pivotally mounted within the brake drum 2 on the studs 21 secured to the backing plate 11, and is provided with the groove engaging rollers 22. A block 23, pivoted in the free end of the yoke 18, is tapped to receive the threaded end 24 of a shaft 26 journalled in the backing plate 11.

The projected end of the shaft 26 is provided with a crank 27, which, in turn, is operated by a brake rod 28 connecting with the usual foot pedal of the vehicle. By this arrangement, it is apparent that a pressure applied on the foot pedal will rotate the threaded shaft 26, and cause the yoke 18 to move the clutch member 13 into engagement with the drum clutch surface 9.

Means are provided for utiliziing the turning movement of the engaged clutch member to operate a brake mounted within the drum 2. A brake band 29 is disposed about the inner circumference of the brake drum, and is loosely held in position by a series of spaced brackets 31 mounted on the backing plate 11; the upper end of each bracket being turned over to provide a lip 32 engaging the edge of the brake band 29. As best illustrated in Figure 1, the opposing ends of the brake band 29 are each provided with a bracket 33 having the slots 34 engaging a suitable pin 36 fixed to the backing plate 11.

A tension spring 37, secured at one end to the backing plate 11, and at the other end to the brake band 29, serves to draw one end of the band against its anchor pin 36. The brake band brackets 33 are connected by a pair of pivoted spreader links 38 assembled in the nature of a toggle, and these links are resiliently constrained by a tension spring 39 connected adjacent the mid portions of the toggle. By this arrangement it is apparent that the opposing ends of the brake band 29 are normally held against the anchor pins 36, and that in this position the brake band is free from the brake drum 2.

A cam plate 41 having a cam surface 42 of compound curvature, for duplicate action in either direction of the cam movement, is suitably secured to the clutch member 13. A curved lever 43, fixed on the inner end of a shaft 44 journaled in the backing plate 11, is provided with a following roller 46 adapted to ride on the cam surface 42. The cam plate 41 is restrained in a normal position, viz, a position assumed when the clutch member 13 is disengaged, by a tension spring 47, connected at one end to the backing plate 11, and at the other end to the cam plate 41 opposite the cam surface 42 and at a point mid-way between the ends of that surface.

In the normal position of the cam plate the following roller 46 rests in the depression formed by the compound curved cam surface, so that movement of the cam plate in either direction immediately causes an outward movement of the lever 43. The following roller 46 continues to ride out on the cam surface as the cam plate is rotated, and is finally limited in its movement by the stops 48 formed at the ends of the cam surface 42. The curvature of the cam surface is preferably such that, assuming a constant angular velocity of the cam plate, the lever 43 is moved outwardly at a constant rate as the following roller 46 approaches its limiting position.

A link 49, pivoted at one end to the lever 43, and at the other end to the common pivot pin 51 of the spreader links 38, operatively connects the lever 43 with the toggle. By this arrangement it is apparent that an outward movement of the lever 43 operates to spread the links 38, and consequently the opposing ends of the brake band 29, to effect engagement of the brake band with the drum 2. This engagement will be effected regardless in which direction the wheel carrying the mechanism happens to be rotating. In this connection, it is to be noted that the specific mounting of the brake band 29 plays an important role, because the band is free to work against one of the anchor pins 36 in one direction of rotation of the drum 2, and against the other anchor pin in the other direction of rotation.

Means are provided for actuating a brake on another wheel of the vehicle by the operation of the mechanism just described. A crank 52 is secured on the outer end of the shaft 44; a collar 53 being provided on the shaft, between the backing plate 11 and the lever 43, as a spacer to position the lever. Considering that the brake mechanism as illustrated is mounted on the rear wheel of an automobile, and that a similar mechanism is mounted on the corresponding front wheel, a rod 54 is connected between the crank 52 on the rear wheel brake and the crank 27 on the front wheel brake. In this assembly, of course, it is unnecessary to have the crank 52 in the front wheel mechanism, and an ordinary collar mounted on the projecting end of the shaft 44 would serve to hold the shaft in position.

Figure 3 shows a modification of my invention. In this case the normal position of the cam plate 41 is altered somewhat, and one of the spreading links 38 of the toggle is provided with an extended portion 55 carrying the following roller 46. This mechanism may be used on a rear wheel where it is not desirable to operatively connect it with a front wheel brake, or it may conveniently be used as a front wheel brake connected for operation with a rear wheel brake mechanism similar to that shown in Figures 1 and 2.

*Operation*

Considering that an automobile is equipped with brake mechanism embodying my invention, with mechanism shown in Figures 1 and 2 on the rear wheels and the mechanism shown in Figure 3 on the front wheels, a pressure is applied to the foot pedal in the usual manner in order to slow down or stop the car. This action engages the clutches in the rear wheel brakes, and causes the clutch member 13 to turn in the direction of the wheel rotation. As a result, the cam plate 41 is rotated to move the curved lever 43 outwardly. This outward movement tensions the connecting link 49 and causes the toggle links 38 to spread against the action of the spring 39. Consequently, the opposing ends of the brake band 29 are spread apart to move the band into engagement with the drum 2.

Upon engaging the drum, the band rotates slightly until one end of the band is stopped by an anchor pin 36. The brake band now binds against the drum to retard its rotation. Upon release of the pressure of the foot pedal the clutch member 13 is disengaged, and the cam plate 41 rotated back to its normal position by the spring 47. Subsequently, the action of the springs 37 and 39 disengage the brake band 29, and also move the lever 43 back to its normal position.

Simultaneous with the rotation of the shaft 44 by the lever 43, the crank 52 is rotated to tension the rod 54 connected with the front wheel brake mechanism. This action effects the engagement of the clutch member 13 in the front wheel brake in a manner similar to the engagement of the clutch in the rear wheel brake. Rotation of the cam plate 41 in the front brake causes the toggle link with the extension 55 to move outwardly. As a result, the toggle links 38 are spread to engage the brake band 29 in a manner similar to that described in connection with the rear wheel brake.

The use of the brake band actuating toggle in combination with the clutch actuated cam is to be noted. This feature permits a large braking action to be obtained with a relatively small applied force. In view of this, the brake mechanism embodying my invention is of particular value when used in large and heavy vehicles, such as trucks and stage coaches. Another important feature of construction is the arrangement of the brake band 29 together with the anchor pins 36, which feature allows the band to assume a position to obtain the maximum braking action regardless in which direction the brake drum happens to be rotating.

It is also to be noted that, since the force for engaging the brake band 29 and drum 2 is derived largely from the rotation of the drum, the braking force is proportional to the movement being retarded. Consequently, there will be no skidding or sliding of the wheels when the brakes are applied. Furthermore, the brakes do not require adjustment, and the mechanism may be used constantly without worry or trouble. These features, coupled with the fact that they exist in a comparatively simple mechanism, lead to a brake construction possessed of particular merit in practical applications.

I claim:

1. A brake mechanism comprising a rotatable drum, a backing plate, a brake band mounted for engagement with the drum, means for moving the band into engagement with the drum, a clutch member mounted for turning movement and engageable with the drum, a cam mounted for movement with the clutch member, a shaft journaled in the backing plate, a lever mounted for rotation with the shaft and having a following roller adapted to ride on the cam so that the lever will be moved and the shaft rotated upon turning of the clutch member, a crank mounted for rotation with the shaft, and means connecting the lever with the brake band moving means for actuating said means to engage the band with the drum.

2. A brake mechanism comprising a rotatable drum, a backing plate, a turnable clutch member mounted within the drum and engageable therewith, a shaft journaled on and extending through the backing plate, a crank mounted for rotation with the outer end of the shaft, means interposed between the inner end of the shaft and the clutch member and connecting the shaft for rotation with said member, a braking device in the drum and engageable therewith, and means within the drum and actuated by said clutch member for applying the braking device to the drum.

3. A brake mechanism comprising a rotatable drum, a backing plate, a turnable clutch member mounted within the drum and engageable therewith, a shaft journaled on and extending through the backing plate, a crank mounted for rotation with the outer end of the shaft, means including a cam interposed between the inner end of the shaft and the clutch member and connecting the shaft for rotation with said member, a braking device in the drum and engageable therewith, and means within the drum and actuated by said cam for applying the braking device to the drum.

4. A brake mechanism comprising a rotatable drum, a backing plate, a turnable clutch member mounted within the drum and engageable therewith, a cam positioned within the drum and mounted for movement with the clutch member, a shaft journaled on and extending through the backing plate, a lever fixed for rotation on the inner end of the shaft and having a following roller adapted to ride on the cam, a crank fixed for rotation on the outer end of said shaft, a brake band mounted for engagement with the drum, and means connecting the brake band for movement with said lever.

CHARLES W. COLLINS.